United States Patent [19]
Khelifa

[11] Patent Number: 5,556,028
[45] Date of Patent: Sep. 17, 1996

[54] DEVICE AND PROCESS FOR HEATING A PASSENGER COMPARTMENT OF A MOTOR VEHICLE

[75] Inventor: Noureddine Khelifa, Stuttgart, Germany

[73] Assignee: Behr GmbH & Co., Stuttgart, Germany

[21] Appl. No.: 420,786

[22] Filed: Apr. 12, 1995

[30] Foreign Application Priority Data

Apr. 27, 1994 [DE] Germany ............................ 44 14 595.0

[51] Int. Cl.$^6$ .................................................. B60H 1/02
[52] U.S. Cl. ...................................... 237/12.3 A; 62/271
[58] Field of Search ................... 62/94, 271; 237/12.3 A

[56] References Cited

U.S. PATENT DOCUMENTS

| | | | |
|---|---|---|---|
| 2,075,036 | 3/1937 | Hollis | 62/271 X |
| 2,811,223 | 10/1957 | Newton | 62/271 X |
| 4,180,985 | 1/1980 | Northrup, Jr. | 62/271 X |
| 5,042,266 | 8/1991 | Yamashita et al. | 62/271 |
| 5,230,466 | 7/1993 | Moriya et al. | 236/44 A |
| 5,335,719 | 8/1994 | Khelifa et al. | 165/42 |
| 5,388,423 | 2/1995 | Khelifa | 62/238.3 |

FOREIGN PATENT DOCUMENTS

| | | |
|---|---|---|
| 4125993 | 2/1993 | Germany . |
| 4221242 | 1/1994 | Germany . |

OTHER PUBLICATIONS

Kronauer, "Klimatisierung über Sorptionstechnik," Die Kälte und Klimatechnik, Sep. 1991, pp. 623–624, 626, 628, 630, 632, 634.

*Primary Examiner*—William E. Tapolcai
*Attorney, Agent, or Firm*—Foley & Lardner

[57] ABSTRACT

A device for heating a passenger compartment in a motor vehicle comprises a heating device for warming up an air current fed to the passenger compartment, and a sorption reactor with a sorbent such as zeolite or the like, through which at least part of the air current flows. In order to avoid misting of the vehicle windows after starting the motor vehicle, the sorptive capacity of the sorbent received in the sorption reactor is chosen such that it is adapted to the warm-up time of the heat exchanger in such a way that the air current flowing through the sorption reactor and fed directly to the passenger compartment can be dried in an uninterrupted adsorption operation until a predeterminable air-outlet temperature is reached at the heat exchanger.

16 Claims, 8 Drawing Sheets

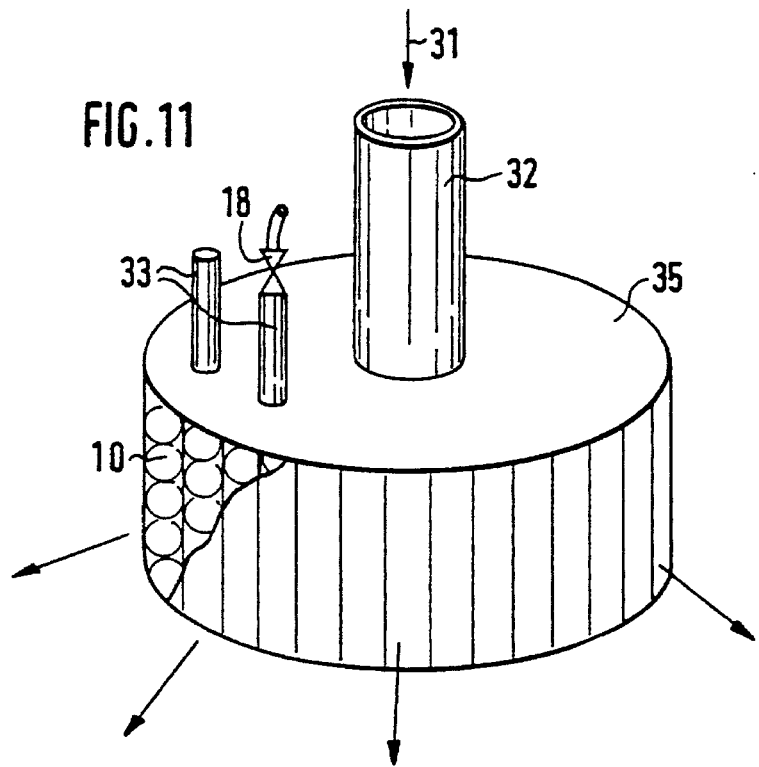
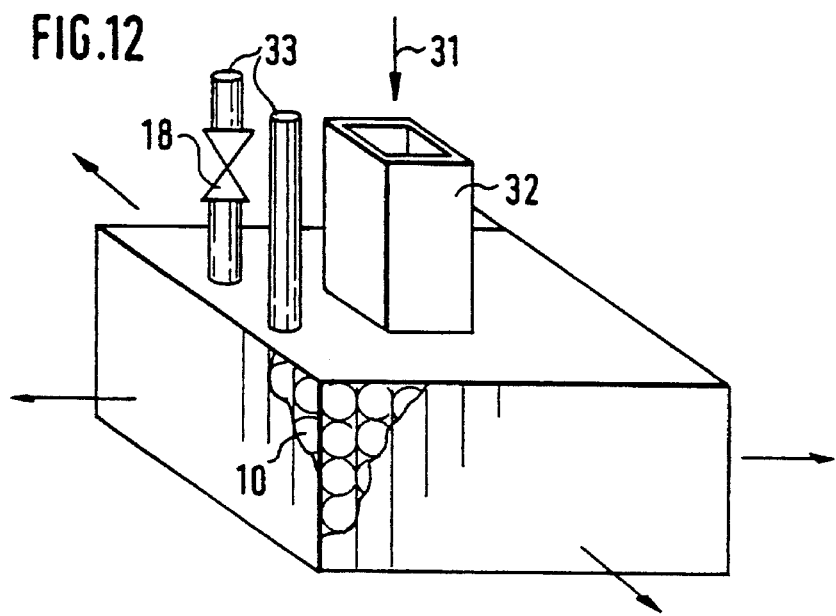

DEVICE AND PROCESS FOR HEATING A PASSENGER COMPARTMENT OF A MOTOR VEHICLE

BACKGROUND OF THE INVENTION

The invention relates to a device and a process for heating a passenger compartment of a motor vehicle.

A device for heating a motor vehicle is described in DE 41 33 917 A1 (corresponding to U.S. Pat. No. 5,335,719, which is hereby incorporated by reference), in which there are provided alternately operating sorption reactors designed with an appropriate volume for achieving an adequate heating output even at the start of a journey. Because large installation space is required, such devices, in order to operate satisfactorily, can only be used in relatively large vehicles. The heating energy available at the beginning of a journey is important to suppress misting of the vehicle windows, so that possible hazardous driving conditions caused by visual obstructions can be avoided.

SUMMARY OF THE INVENTION

The object of the invention is to provide a device for heating a passenger compartment in a motor vehicle with which effective suppression of misted vehicle windows is possible even with a small quantity of sorbent and only a small installation space for the device.

The object is achieved with a device for heating a passenger compartment in a motor vehicle, comprising:

a heating device for warming up an air current fed to the passenger compartment; and a sorption reactor with a sorbent received therein through which at least part of the air current flows, wherein a sorptive capacity of the sorbent received in the sorption reactor is chosen in accordance with a warm-up time of the heating such that the air current flowing through the sorption reactor and fed to the passenger compartment can be dried in an uninterrupted adsorption operation until a predeterminable air-outlet temperature is reached at the heating device.

The invention is based on the idea of using the sorption reactor exclusively for dehumidifying the air. Therefore, the quantity of sorbent can be reduced to a minimum, which ensures drying of the air current by the time a predetermined air-outlet temperature is reached at the heat exchanger. This air current, fed directly to the passenger compartment, is dried in an uninterrupted adsorption operation, thereby effectively preventing misting of the windows.

The sorption reactor, the air ducts supplying and discharging the air current, and the air-current controlling elements are preferably designed as parts of a drier unit which can be flange-mounted onto an existing vehicle heater or an existing vehicle air-conditioning system easily.

In a preferred embodiment of the invention, a desorption heater is provided as the heat exchanger for warming up a heating air current fed to the passenger compartment.

If the heating device is arranged in the sorbent, the required installation space for the drier unit can be further reduced.

According to a preferred process for heating a passenger compartment, when the heat exchanger is put into operation, substantially the entire circulating-air current is passed as an adsorption air current through the sorption reactor before entry into the passenger compartment and, with increasing heating output of the heat exchanger, the adsorption air current passed through the sorption reactor is reduced. In this case, the arrangement may be set up such that, with increasing heating output, the adsorption air current changes without any transition into a desorption air current. It may be expedient in this case to feed at least part of the desorption air current to the passenger compartment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

FIG. 3 is a diagram similar to FIG. 1 which shows the device in a desorption phase, FIG. 4 is a diagram showing another exemplary embodiment of a device according to the invention for heating a passenger compartment in a motor vehicle, FIG. 11 shows a cylindrical sorption reactor with a heating device arranged in the sorbent for isothermal absorption or desorption, FIG. 12 shows a cuboidal sorption reactor with a heating device embedded in the sorbent for isothermal adsorption or desorption.

DETAILED DESCRIPTION OF THE PREFERRED EMBODIMENTS

Figure 1:
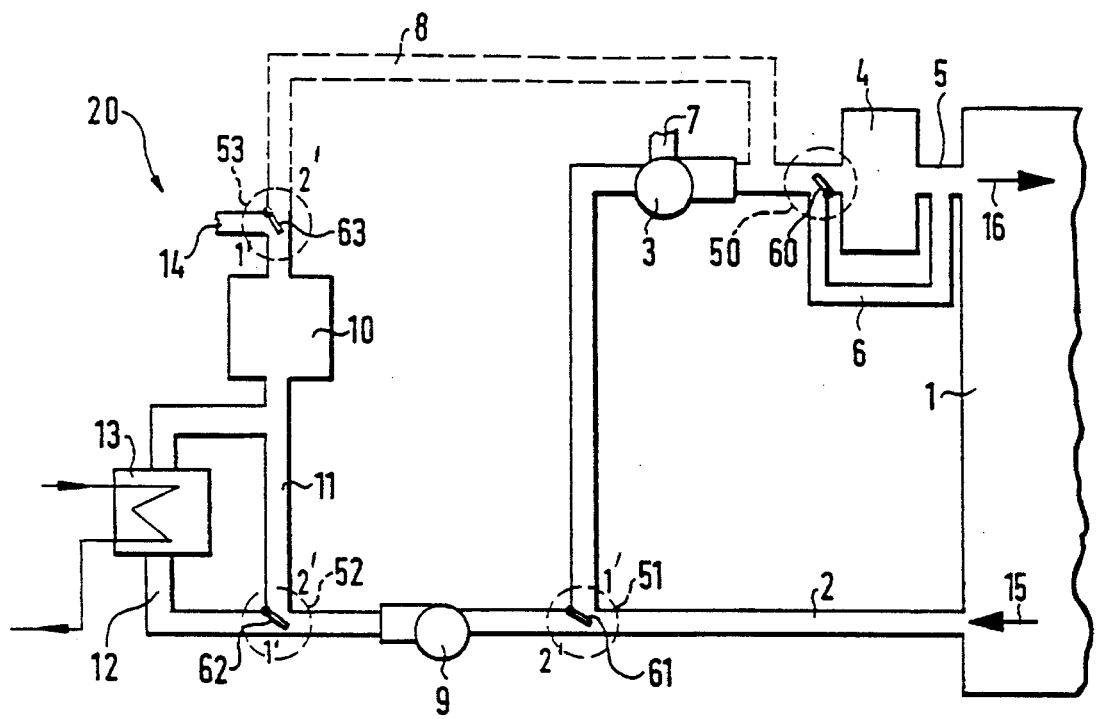
FIG. 1 is a diagram showing a device for heating a compartment with a sorption reactor.

As shown in FIG. 1 the device for heating a passenger compartment 1 substantially comprises a discharge-air duct 2, through which circulating air is drawn out from the passenger compartment i in the direction of arrow 15. The circulating air is fed by a blower 3 to a heating device 4, which is preferably a heat exchanger. The air emerging from the heat exchanger 4 is fed through the supply-air duct 5 to the passenger compartment 1 in the direction of arrow 16 as a heated air current.

The heat exchanger 4 is preferably supplied with the waste heat of a motor vehicle having the passenger compartment 1. For example, it is preferably connected on its primary side to the exhaust-gas flow of a combustion engine or is connected on its primary side to the coolant circuit of the combustion engine. The heat exchanger 4 can be bypassed by an air duct 6. An air-current controlling element 50 with a control damper 60 is arranged upstream of the heat exchanger 4 and depending on the position of the control damper 60, the circulating-air current can be divided between the heat exchanger 4 and the bypass duct 6. Through a fresh-air duct 7, which is preferably connected to the blower 3, fresh air can be mixed in with the circulating-air current.

Connected to the device for heating a passenger compartment 1 is a drying unit 20, which substantially comprises a sorption reactor 10 filled with a sorbent, such as zeolite or the like. On the output side, the sorption reactor 10 is connected to a connecting duct 8 to the supply-air duct 5 upstream of the heat exchanger before the air-current controlling element 50. On the input side, the sorption reactor 10 is connected to the discharge-air duct 2 of the passenger compartment 1 via an air duct 11 and an air-current controlling element 51 having a control damper 61. A blower 9 is arranged in the air duct 11 between the air-current controlling element 51 and the sorption reactor 10.

Downstream of the blower 9 but upstream of the sorption reactor 10, there is arranged parallel to a section of the air duct 11, a duct 12 connected to a desorption heater 13. The parallel duct 12 is connected to the air duct 11 via an air-current controlling element 52 with a control damper 62.

The desorption heater 13 preferably comprises a heat exchanger, which is supplied—as already described with respect to the heat exchanger 4—with the waste heat of the combustion engine driving the motor vehicle.

Downstream of the sorption reactor 10, an exhaust-air duct 14 is connected to the connecting duct 8 via an air-current controlling element 53.

When the combustion engine driving the motor vehicle is started, sufficient waste heat for operating the vehicle heater 4 or the desorption heater 13 is not available. As a result, particularly at low temperatures, misting of the vehicle windows occurs in the passenger compartment 1. To avoid this, the control dampers 61, 62 and 63 of the air-current controlling elements 51, 52 and 53 are switched into a position 1' when the combustion engine is started. The entire circulating-air current carried away in the direction of arrow 15 is passed via the sorption reactor 10 and returned as a dried air current via the supply-air duct 5 into the passenger compartment 1. The air humidity in the passenger compartment is rapidly reduced, so that the risk of the vehicle windows misting is low. After starting the combustion engine, it is therefore possible to reduce the air humidity in the passenger compartment 1 without heating. If sufficient waste heat is available, the air stream fed to the passenger compartment 16 is correspondingly warmed up, thereby further avoiding misting of the vehicle windows.

The sorbent arranged in the sorption reactor is chosen such that its sorptive capacity is chosen in view of the amount of moisture required to be extracted from the air current, in such a way that adequate drying of the air current in an uninterrupted adsorption operation is possible by the time a predeterminable air-outlet temperature is reached downstream of the heat exchanger 4. As soon as sufficient heat output is available, the sorption reactor 10 may no longer be necessary for drying the air current.

When the sorbent has reached its limit of sorptive capacity it must be desorbed. For this purpose, the air-current controlling elements 52 and 53 are moved or switched into an intermediate position, so that the control dampers 62 and 63 are in a position 2'. The air current fed via the blower 9 flows through the desorption heater 13 for providing a dry, heated air current to the sorption reactor 10 to drive out the moisture stored in the sorbent. The warm and moist air current is then discharged into the environment via the exhaust-air duct 14. In the exemplary embodiment according to FIG. 1, the direction of flow of the desorption air current and the adsorption air current is the same.

Figure 2:
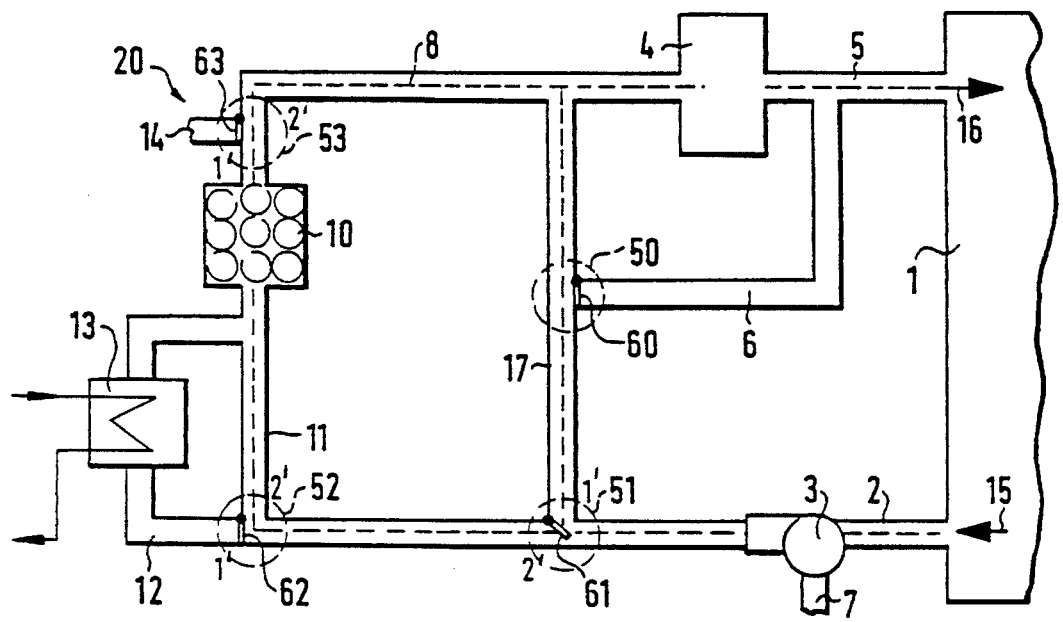
FIG. 2 is a diagram similar to FIG. 1 which shows the device in an adsorption phase.
Figures 3, 4:
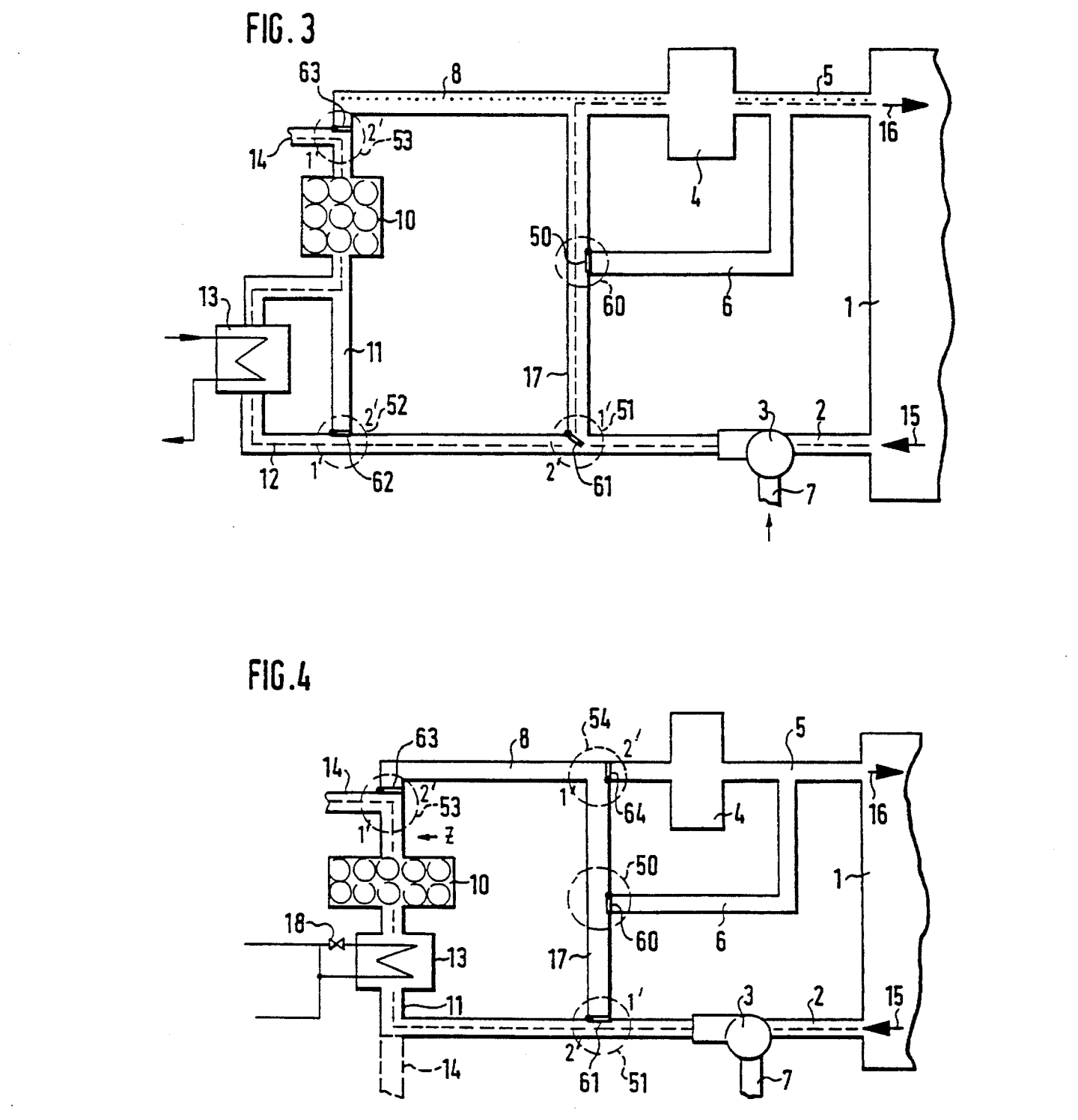

The circuit diagrams shown in FIGS. 2 and 3 of a device for heating a passenger compartment 1 correspond to that according to FIG. 1 in their basic constructions. The same reference numerals are used for the same parts.

In FIGS. 2 and 3, the blower 3 is arranged in the discharge-air duct 2, and hence it is possible to dispense with the blower 9 arranged in the drying unit according to FIG. 1. As in the exemplary embodiment according to FIG. 1, the heat exchanger 13 provided as the desorption heater is -permanently supplied on its primary side with the waste heat of the combustion engine, and the heat exchanger 13 can be switched into or out of the air current by means of the air-current controlling element 52.

In the exemplary embodiment according to FIG. 2, the operating state of the device during the warm-up phase of the combustion engine is represented. When the combustion engine is started, the control damper 61 of the air-current controlling element 51 is in position 1', corresponding to the drawn-in position 1' of the other air-current controlling elements, so that the entire air current delivered by the blower 3 is passed via the sorption reactor 10 and is fed as a dried air current via the supply-air duct 5 to the passenger compartment 1 in the direction of arrow 16. The heat exchanger 4 fed by the waste heat of the combustion engine builds up its heating output as the operating time of the combustion engine increases. The control damper 61 of the air-current controlling element 51 is swiveled in the direction of position 2' proportionally or in step increments in accordance with the heat output of the heat exchanger 4. In the central position drawn in FIG. 2, only part of the air delivered by the blower 3 flows via the sorption reactor 10; the remaining part flows via a connecting duct 17 directly to the heat exchanger 4. As the output capacity of the sorption reactor 10 decreases, the quantity of air to be dried is correspondingly reduced. The reduced output of the sorption reactor 10 is compensated by the increasing heat output of the heat exchanger 4. Since the sorbent gives off heat when it takes up moisture, the sorption reactor 10 also provides a certain thermal energy at the beginning of the heating operation.

As FIG. 3 shows, a desorption of the sorption reactor 10 is possible by switching over the air-current controlling elements 52 and 53. The control dampers 62 and 63 are for this purpose in position 2' so that a partial air current of the air current delivered by the blower 3, branched off by means of the control damper 61 of the air-current controlling element 51, is heated by means of the desorption heater 13, and fed to the sorption reactor 10 to drive out the moisture stored in the sorbent. The warm and moist air current can be discharged via the exhaust-air stub 14. If desired, part of this moist and warm air current may be fed to the passenger compartment 1, as represented by the dotted lines in FIG. 3, by positioning the control damper 63 appropriately.

The exemplary embodiment according to FIG. 4 corresponds in basic construction to that according to FIGS. 2 and 3, and the same reference numerals are used for the same parts. As a departure from the exemplary embodiments described above, the desorption heater 13 is provided in the air duct 11, which feeds the air current to the sorption reactor 10. As seen from the flow direction of the air current, the desorption heater 13 lies upstream of the sorption reactor 10, such that the adsorption air current and the desorption air current have the same direction of flow. The desorption heater, connected for example to the coolant circuit of the combustion engine, has a valve 18, which is closed in the adsorption phase and is open in the desorption phase. Represented in FIG. 4 is the desorption phase, in which the air current of the blower 3 can be used completely for desorption. The air current flows through the heat exchanger 13, enters the sorption reactor 10 in a heated state desorbs the moisture in the sorbent and exits out into open air via the exhaust-air stub 14 and the air-current controlling element 53 switched into a corresponding position.

It may be desirable to arrange the desorption heater 13 downstream of the sorption reactor 10 at the location Z, in which case the exhaust-air stub 14 is arranged on the side of the sorption reactor 10 opposite to the heat exchanger side. The desorption air current is then fed via the air-current controlling element 51 in position 2', the connecting duct 17, and an additional air-current controlling element 54 with a control damper 64 in position 2', counter to the direction of flow of the adsorption flow, and further via the heat exchanger arranged at the location Z, to the sorption reactor 10.

Figure 5:
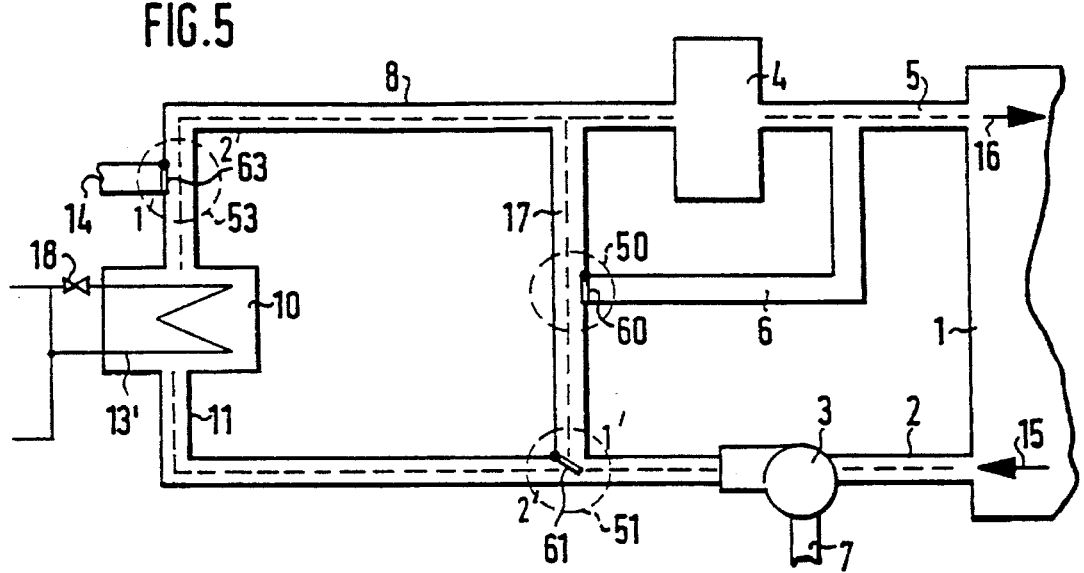
FIG. 5 is a diagram showing a device with a heating device integrated in the sorption reactor.

In the exemplary embodiment according to FIG. 5, a heating device 13' is arranged in the sorption reactor 10, by means of which the sorbent is heated up directly. The heating device 13' may be connected via a valve 18 to the cooling circuit of the combustion engine.

With valve 18 closed, an adiabatic adsorption takes place and the heat of reaction released upon moisture adsorption is discharged by the dry adsorption air current. If the valve 18 is open, an isothermal adsorption takes place and the heat of reaction released upon moisture adsorption is discharged via the cooling water flowing through the heating tubes in the sorption reactor 10, thereby obtaining a preheating of the cooling water.

A heat exchanger whose primary side is subjected to the cooling-water flow and whose secondary side is charged with a sorbent can also be used. Such a heat exchanger can advantageously be used instead of the heat exchanger of the vehicle heater.

Figure 6:
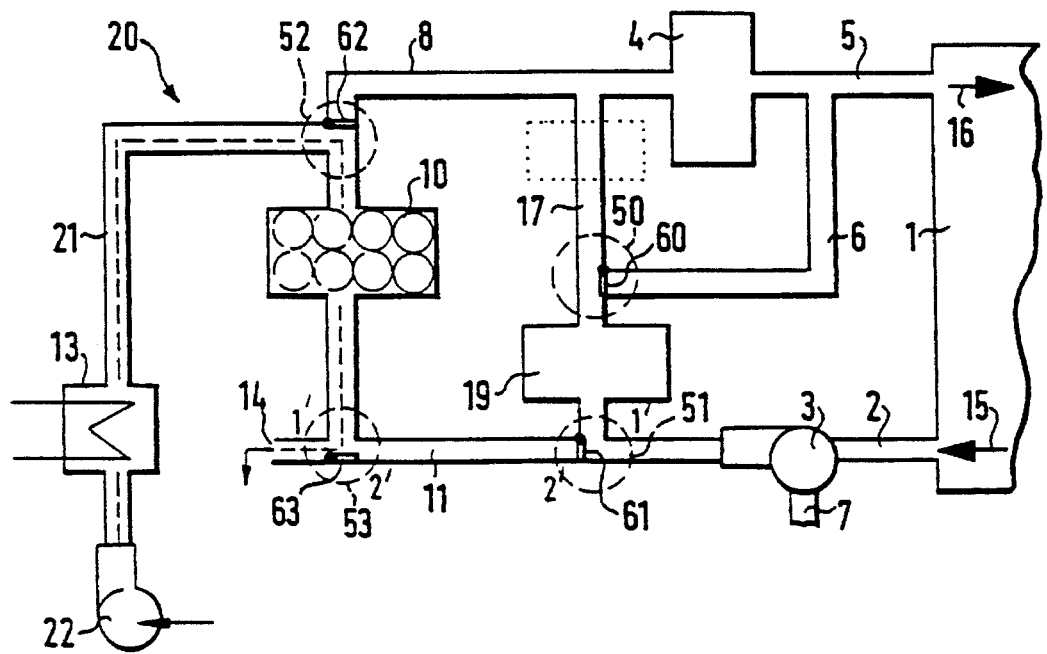
FIG. 6 is a diagram showing still another exemplary embodiment of the device according to the invention.

In the exemplary embodiment according to FIG. 6, a drying unit 20 connected to a device for heating the passenger compartment 1 is shown. In this embodiment, provided that the vehicle is equipped with an air-conditioning system, an evaporator 19 may be arranged in the connecting duct 17. The heating device 4, arranged in the supply-air duct 5, may be likewise provided in the connecting duct 17, as represented in FIG. 6 by dotted lines. In this arrangement, the bypass duct 6 for bypassing the heating device 4, branches off from the connecting duct 17 to the supply-air duct 5 between the evaporator and the heating device 4.

Arranged parallel to the connecting duct 17 is the sorption reactor 10, which has on its input side and on its output side air-current controlling elements 52 and 53. Connected via the air-current controlling element 53 is an exhaust-air duct 14 and connected via the air-current controlling element 52 is a desorption duct 21, which is fed by a blower 22. Arranged in the desorption duct 21—implementing the design already described—is a desorption heater 13. This configuration has the advantage that the desorption air current is directed against the adsorption air current, whereby an energysaving, rapid desorption of the reactor 10 is obtained.

Figure 7:
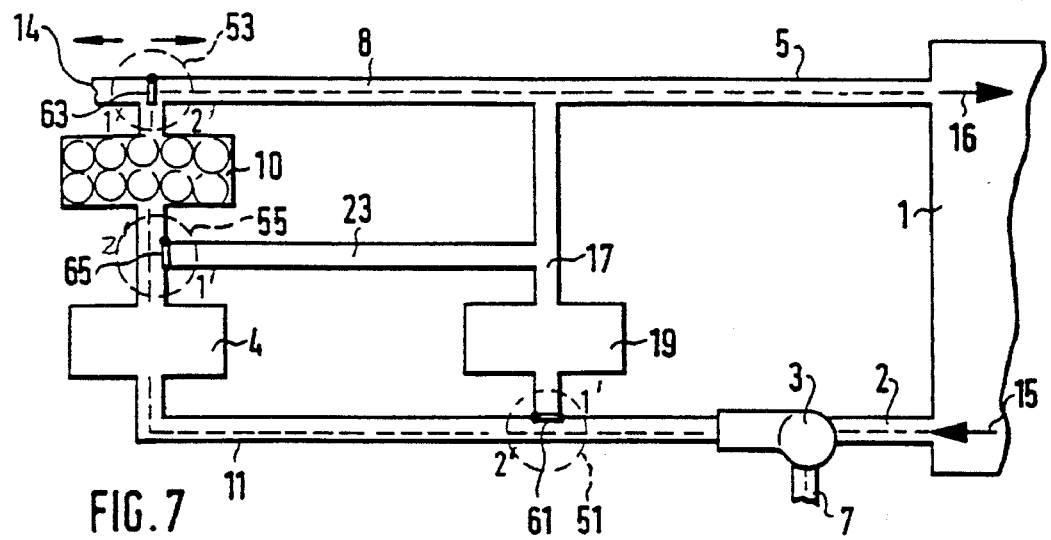
FIG. 7 is a diagram showing a device according to the invention with a joint heating device for the air current fed to the passenger compartment and for the desorption air current.
Figure 8:
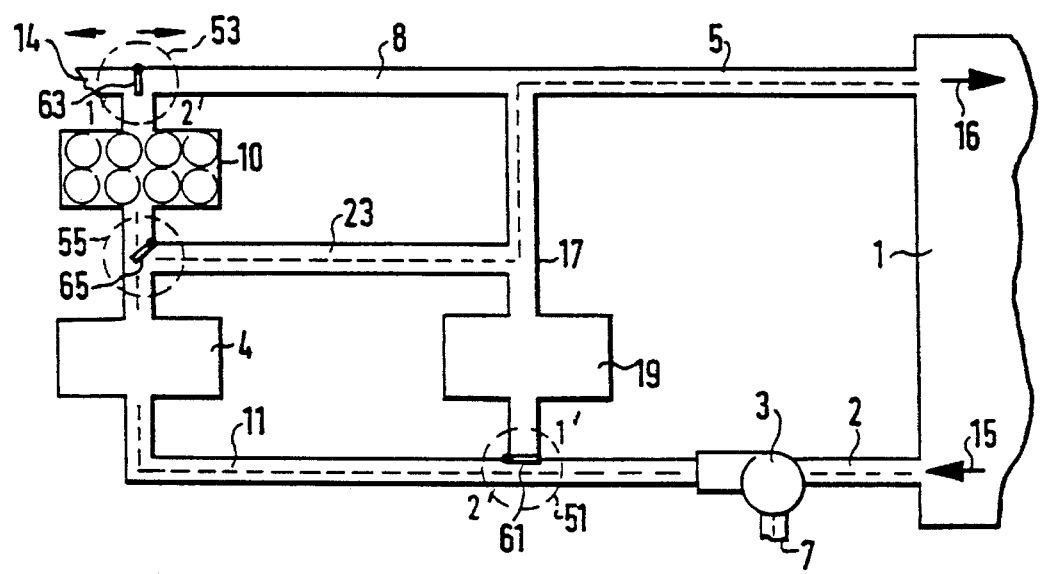
FIG. 8 is a diagram showing the device according to FIG. 7 in the desorption phase.

In the exemplary embodiment according to FIGS. 7 and 8, the heating device for the air current is arranged upstream of the sorption reactor 10 and also functions as the desorption heater. In the connecting duct 17 there may be arranged the evaporator 19 of a vehicle air-conditioning system, the evaporator and the heat exchanger 4 being connected to each via a cross-duct 23.

In the position 1' of the air-current controlling elements 51 and 55, the circulating-air current drawn off in the direction of arrow 15 is passed completely via the sorption reactor 10 and is returned into the passenger compartment 1 via the supply-air duct 5 in the direction of arrow 16. If heating output is available at the heat exchanger 4, the control damper 65 of the air-current controlling element 55 may assume an intermediate position, as represented in FIG. 8, so that a partial current of the air current delivered by the blower 3 flows via the cross-duct 23 directly into the supply-air duct 5 and another partial air current is fed via the sorption reactor 10 in a dried state to the supply-air duct 5. With increasing heating output, the air current entering the sorption reactor 10 desorbs the sorbent located in the reactor, and the control damper 63 of the air-current controlling element 53 discharges the exiting air current as an exhaust-air current via the exhaust-air stub 14. It may be desirable to feed part of the desorption air current as a warm and moist air current via the supply-air duct 5 to the passenger compartment, in order to avoid excessively dry air in the passenger compartment.

Figure 9:
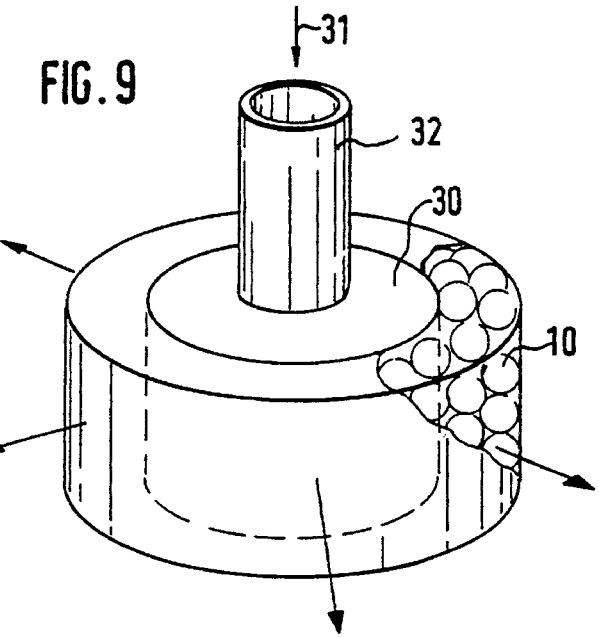
FIG. 9 shows a cylindrical structural unit comprising a heat exchanger and a sorption reactor for adiabatic adsorption or desorption.
Figure 10:
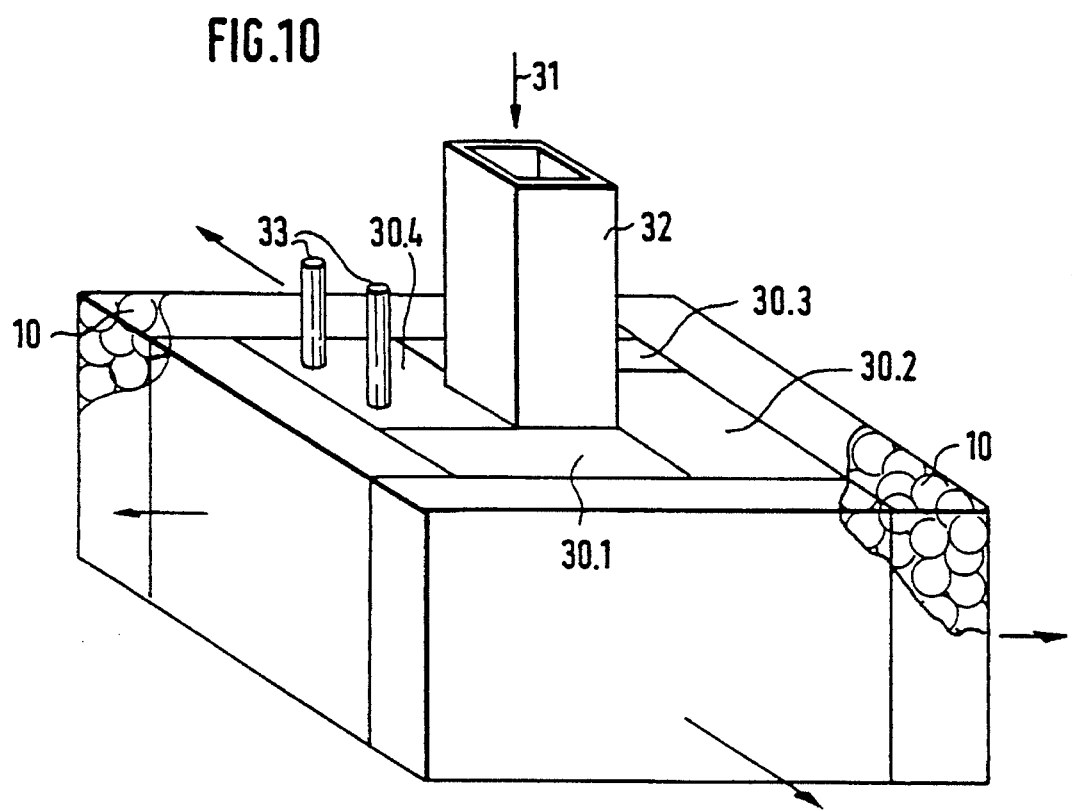
FIG. 10 shows a structural unit comprising a cuboidal sorption reactor with internal heat exchanger for adiabatic adsorption or desorption.

In FIGS. 9 and 10, a structural unit comprising a sorption reactor 10 and a heat exchanger 30 or 30.1, 30.2, 30.3, 30.4 is shown. The heat exchanger is arranged upstream of the sorption reactor in the direction of flow 31 of the air. Such a structural unit may be arranged cylindrically—as shown in FIG. 9—or else in the manner of a cuboid, as shown in FIG. 10. In both cases, the feeding air duct 32 is arranged centrally, and the structural units arranged such that air flows through from inside to outside. With such a construction, an adiabatic adsorption or an adiabatic desorption can be realized. The connecting lines 33 (see FIG. 11) of the primary side are preferably connected to the cooling circuit of the combustion engine.

In the exemplary embodiments according to FIGS. 11 and 12, sorption reactors 10 with a heating device 13' (not shown because it is embedded in the sorbent) mounted in the sorbent are shown. In the case of a cylindrical body according to FIG. 11, the sorbent is received in an annular basic housing with the heating device 13', to which a heat transfer medium can be fed via connecting lines 33. The air is fed in—as already explained with respect to FIGS. 9 and 10—in the center of the annular basic housing 35 in the direction of flow 31 and exits radially. In the supply line to the heating device there is preferably arranged a valve 18.

The cuboidally configured sorption reactor according to FIG. 12 is of the same construction in principle as that according to FIG. 11. Again, a central air duct 32 feeds the air in the direction of flow 31. The air is deflected by 90° in the sorption reactor 10 and exits perpendicularly with respect to the side walls of the sorption reactor 10. The connecting lines 33 for the heat transfer medium have a valve 18 for switching the heating device on and off.

If, in the case of the exemplary embodiments according to FIGS. 11 and 12, when the heat transfer medium which flows through the heating device is still cold as during the starting phase of the combustion engine, the moisture contained in the circulating air is isothermally adsorbed, since the heat released is discharged via the heat transfer medium. As soon as the waste heat produced by the combustion engine heats up the heat transfer medium further, the sorbent in the sorption reactor 10 is heated up and desorption takes place isothermally. In this case, the adsorption operation changes without any transition into a desorption operation, without any changing-over of the air or of the heat transfer medium having to take place. If a further adsorption is desired when the heating output commences, the valve 18 is closed, so that an adiabatic adsorption is possible until the sorbent is exhausted.

Figure 13:
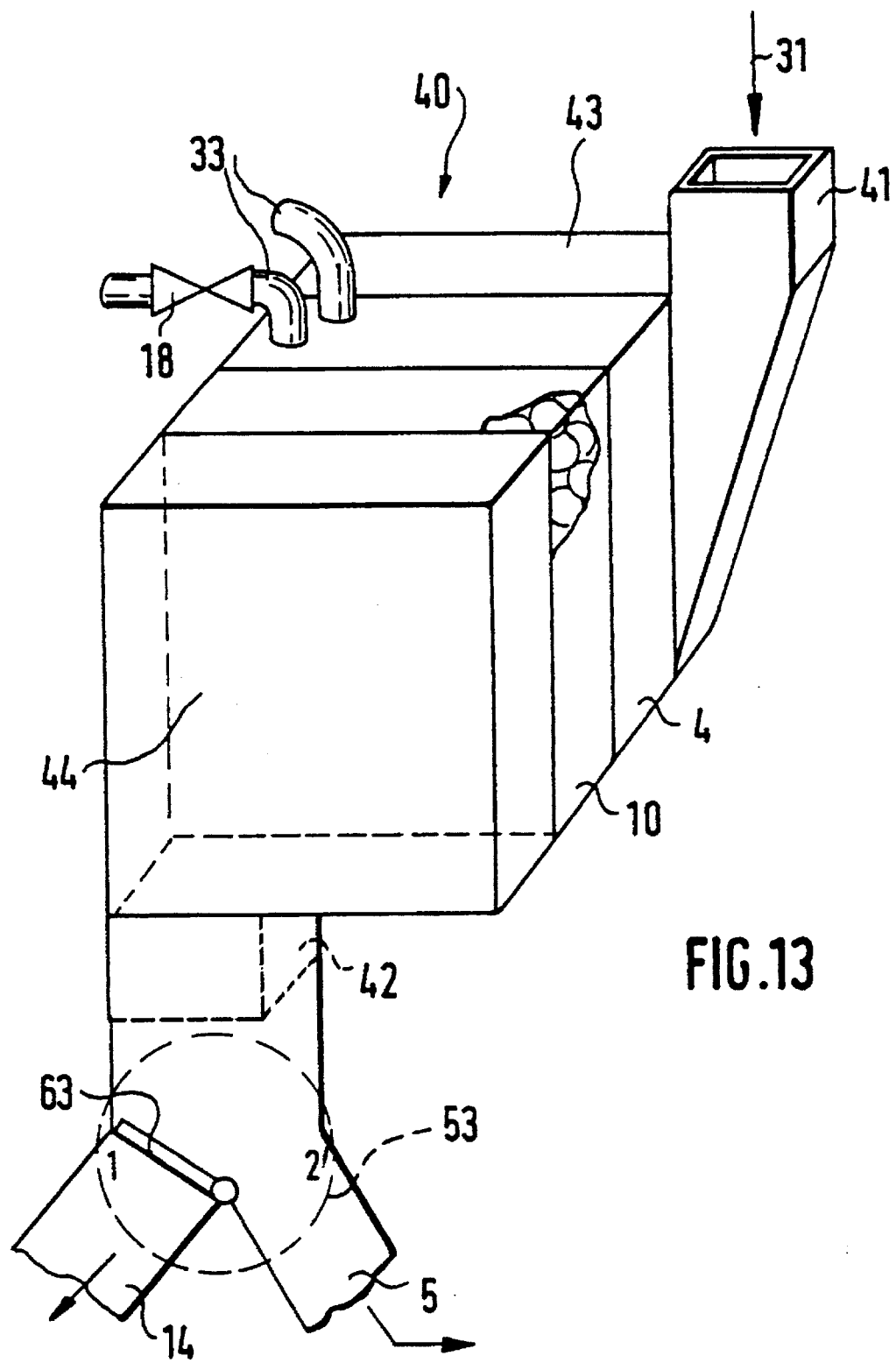
FIG. 13 is a perspective view of an air-ducting housing for adiabatic operation.

In the exemplary embodiment according to FIG. 13, an air-ducting housing 40 is shown, which exhibits a connecting stub 41 for the air to be fed in and a connecting stub 42 for the air to be discharged. The connecting stub 42 is in connection with an air duct via an air-current controlling element 53 (see also in this respect the diagram in FIG. 8). In the position 1' of the air-current controlling element 53, the air current is fed to the supply-air duct 5 to the passenger compartment 1 whereas in position 2' of the control damper 63, the air is discharged via the air stub 14.

The air-ducting housing substantially comprises an air feeding chamber 43, a heat exchanger 4, preferably supplied with the waste heat of the combustion engine, a sorption reactor 10 and an air discharge chamber 44. The air feeding chamber 43 and the air discharge chamber 44 are of the same size, as are the sorption reactor 10 and the heat exchanger 4, and form a joint, approximately cuboidal air-ducting housing 40. Via connecting lines 33, a heat transfer medium, for example cooling water or exhaust gas of the combustion engine, can be fed to the heat exchanger 4 on its primary side. In the supply line to the heat exchanger 4 a valve 18 is preferably arranged, as described for FIGS. 4 and 5. With the air-ducting housing 40 shown in FIG. 13, an adiabatic adsorption or an adiabatic desorption is possible.

Figure 14:
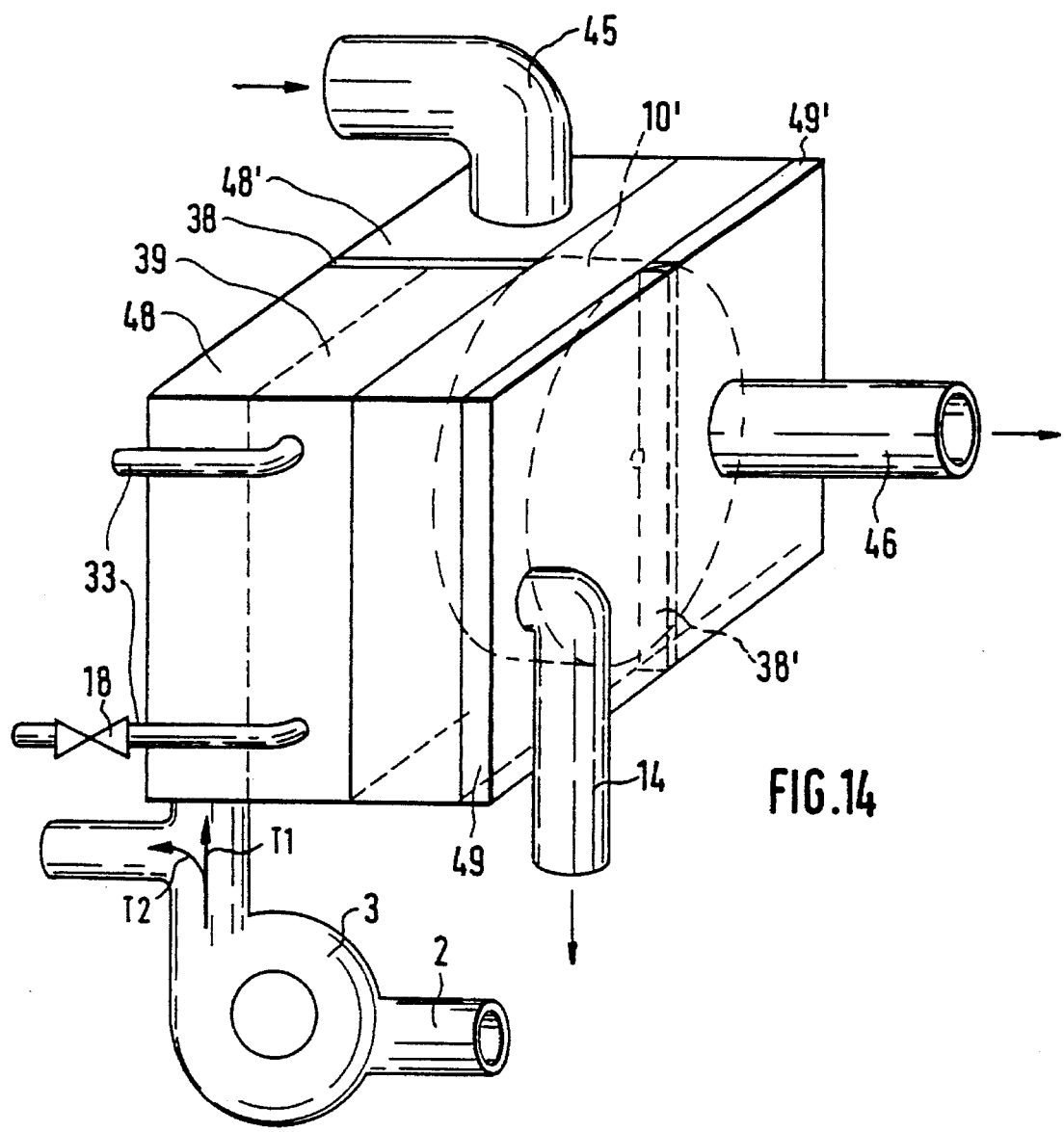
FIG. 14 is another perspective view of an air-ducting housing for adiabatic operation.

The air-ducting housing according to FIG. 14 has a sorption reactor with an integrated heating device, which in the exemplary embodiment shown is formed by a heat exchanger 39 through which the heat transfer medium flows and the connecting lines 33 protrude outward. On the inflow side of the rotating sorption reactor 10' there are formed two air feeding chambers 48 and 48', between which a dividing wall 38 stands. In the air feeding chamber 48, which is connected to the pressure side of the blower 3, the heat exchanger 39 is located. Behind the air feeding chambers in the direction of flow there is located the sorption reactor 10', which is adjoined by air-outlet chambers 49 and 49', which are separated from each other by means of a wall 38'. By means of the blower 3, air is drawn through the discharge-air duct 2 from the passenger compartment 1 and a first partial current T1 is fed to the air-feeding chamber 48. The second partial current T2 is fed to the inlet stub 45, which opens into the chamber 48' and consequently to the sorption reactor 10', such that it can then flow away via the outlet stub 46 connected to the air-outlet chamber 49'. The desorption air current is discharged out of the air-outlet chamber 49 via the exhaust-air stub 14. The desorption reactor equipped with the heating device permits an adiabatic adsorption or an adiabatic desorption. The heating device is designed such that it can be switched off by a valve 18.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A device for heating a passenger compartment in a motor vehicle, comprising:

a heating device for warming up an air current fed to the passenger compartment; and a sorption reactor with a sorbent received therein through which at least part of the air current flows, wherein a sorptive capacity of the sorbent received in the sorption reactor is chosen in accordance with a warm-up time of the heating device such that the air current flowing through the sorption reactor and fed to the passenger compartment can be dried in an uninterrupted adsorption operation until a predeterminable air-outlet temperature is reached at the heating device.

2. The device as claimed in claim 1, wherein said sorbent is zeolite.

3. The device as claimed in claim 1, wherein the heating device is a heat exchanger to which waste heat from a drive of the vehicle is supplied.

4. The device as claimed in claim 2, further comprising a plurality of air ducts in fluid communication with the sorption reactor, and air-current controlling elements for controlling air current in the plurality of air ducts.

5. The device as claimed in claim 4, wherein the sorption reactor, the air ducts, and air-current controlling elements form a drying unit which can be built into a vehicle heater or a vehicle air-conditioning system.

6. The device as claimed in claim 5, further comprising a desorption heater arranged upstream of the sorption reactor.

7. The device as claimed in claim 6, wherein the desorption heater is the heat exchanger of the heating device heater warming up the air current.

8. The device as claimed in claim 6, wherein the desorption air current and the adsorption air current flow in the same direction.

9. The device as claimed in claim 1, wherein the heating device is embedded in the sorbent and arranged in the sorption reactor.

10. The device as claimed in claim 1, wherein the desorption heater and the sorption reactor form a structural unit.

11. The device as claimed in claim 10, wherein the structural unit is an air-duct housing.

12. A device for heating a passenger compartment in a motor vehicle, comprising:

a heating device for heating an air current supplied to the passenger compartment;

a sorption reactor having a sorbent received therein and connected to the heating device for fluid communication therewith; and an air flow control element, responsive to an output of heat from the heating device, for dividing the air current between said heating device and said sorption reactor.

13. The device as claimed in claim 12, wherein the heating device is an heat exchanger supplied with waste heat from the vehicle.

14. The device as claimed in claim 12, wherein said sorbent is zeolite.

15. The device as claimed in claim 12, wherein said heating device is embedded in said sorbent.

16. The device as claimed in claim 12, further comprising means for circulating said air current.

* * * * *